(No Model.)
L. D. YORK.
JAIL BAR.
No. 292,527. Patented Jan. 29, 1884.
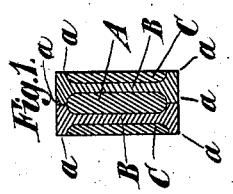
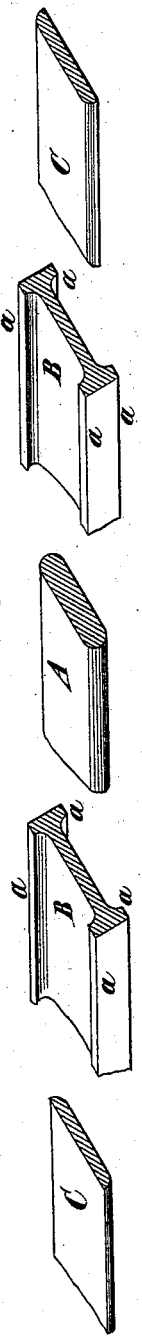
Witnesses:
James R. Bowen
Alfred L. Brown
Inventor:
Levi D. York,
by his attorney,
Edwin H. Brown.
N. PETERS. Photo-Lithographer, Washington, D. C.

United States Patent Office.

LEVI D. YORK, OF PORTSMOUTH, OHIO.

JAIL-BAR.

SPECIFICATION forming part of Letters Patent No. 292,527, dated January 29, 1884.

Application filed April 18, 1883. (No model.)

*To all whom it may concern:*

Be it known that I, LEVI D. YORK, of Portsmouth, in the county of Scioto and State of Ohio, have invented a certain new and useful Improvement in Jail, Prison, and Grating Bars, of which the following is a specification.

My improvement relates to jail, prison, and grating bars which are composed of layers of iron and steel; and the object of the improvement is to facilitate the manufacture of such bars, and also to improve the bars.

The improvement consists in the combination, in a bar, of a layer of iron and two layers of steel fitting outside the said iron layer, and having flanges extending over the edges of the iron layer.

The improvement also consists in the combination, in a bar, of a layer of iron, two layers of steel fitting against the said iron layer, and two iron layers fitting against the outer sides of the steel layers, the said steel layers having flanges which extend over the edges of the said iron layers.

In the accompanying drawings, Figure 1 is a cross-section of a jail, prison, or grating bar embodying my improvement; and Fig. 2 is a perspective view, on an enlarged scale, of its several layers detached from each other.

Similar letters of reference designate corresponding parts in both figures.

A designates a central layer of iron. It is shown as having parallel sides rounded off at the longitudinal edges.

B designates two layers of steel which have the edges turned outward, so as to form flanges or lips *a*. The flanges or lips extend so far from the body of these layers B that when the two layers B are put together with the layer A between them the flanges or lips on adjacent sides of the layers B will meet and cover the edges of the layer A.

C designates outer layers of iron. They are made sufficiently narrow to fit between the outer flanges of the layers B. Their sides are parallel, but at the edges the inner sides are rounded off to conform to the curve at the base of the flanges of the layers B. By lapping over the iron layers, the flanges of the steel sections keep the iron sections in place, and therefore maintain all sections in their proper relative positions when piled together. This is important, as the layers will not be easily got out of place or disarranged when heated for welding. After the layers are piled and heated, they may be hammered to weld them together, and afterward subjected to rolls to reduce them to the proper dimensions; or they may, without the preliminary hammering, be subjected to the rolls and welded and reduced thereby.

I may, if desirable, arrange the iron bars in a suitable mold and cast the steel layers between them and over the edges, so as to produce a bar of the structure shown in the drawings.

Bars made according to my improvement are superior to bars of ordinary make, as the flanges of the steel layers cover the central iron layer, so that it cannot be drilled through, and yet the advantage of the iron in resisting blows and shocks is kept available. The flanges, therefore, not only facilitate the manufacture of the bars by lessening the liability of disarranging their layers when piled, but also improve the bars, because the flanges prevent any portion of the central iron layer from being drilled through.

I do not claim, broadly, as of my invention a bar composed of a layer of iron, two layers of steel on opposite sides of the layer of iron, and two other layers of iron covering the outer sides of the steel layers; nor do I claim such a bar when the steel layers have flanges which are turned outward only at the edges, and which leave the central layer of iron exposed at the edges, thereby affording facility for drilling through it. The advantages of protecting the central iron layer by the flanges of the steel layers according to my invention are fully described, as also the greater facility for piling afforded by such construction.

What I claim as my invention, and desire to secure by Letters Patent, is—

1. In a bar, the combination of a layer of iron and two layers of steel fitting outside the said iron layer, and having flanges extending over the edges of the iron layer, substantially as specified.

2. In a bar, the combination of a layer of iron, two layers of steel fitting against the said iron layer, and two iron layers fitting against the outer sides of the steel layers, the said steel layers having flanges which extend over the edges of the said iron layers, substantially as specified.

LEVI D. YORK.

Witnesses:
WM. B. GRIER,
P. S. JANES.